A. R. Nixon,

Cotton Planter.

No. 98,183.  Patented Dec. 21, 1869.

Witnesses:
F. Lehmann
H. L. Ewers

Inventor:
A. R. Nixon
per Alexander Mason
Attys.

United States Patent Office.

A. R. NIXON, OF MEMPHIS, TENNESSEE.

Letters Patent No. 98,183, dated December 21, 1869.

---

IMPROVEMENT IN COTTON-SEED PLANTERS.

---

The Schedule referred to in these Letters Patent and making part of the same.

---

*To all whom it may concern:*

Be it known that I, A. R. NIXON, of Memphis, in the county of Shelby, and in the State of Tennessee, have invented certain new and useful Improvements in Cotton-Planters; and do hereby declare that the following is a full, clear, and exact description thereof, reference being had to the accompanying drawings, and to the letters of reference marked thereon, making a part of this specification.

The nature of my invention consists in the construction and general arrangement of a "cotton-planter," as will be hereinafter fully set forth.

In order to enable others skilled in the art to which my invention appertains, to make and use the same, I will now proceed to describe its construction and operation, referring to the annexed drawings, in which—

Figure 1:
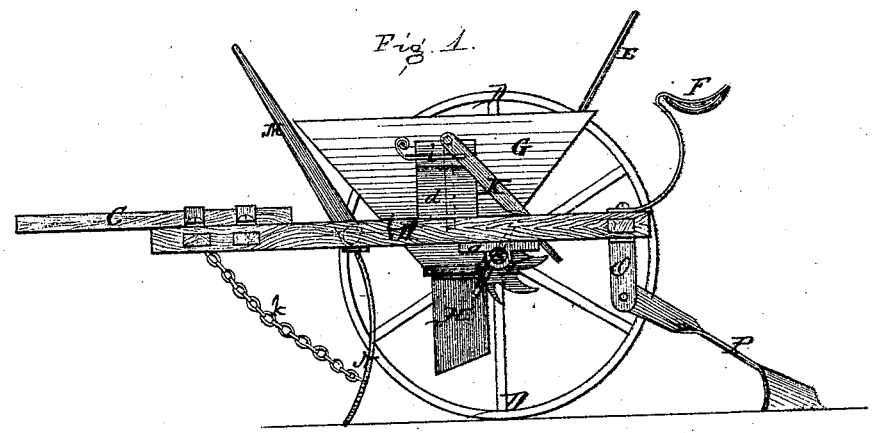

Figure 1 is a side elevation, and

Figure 2:
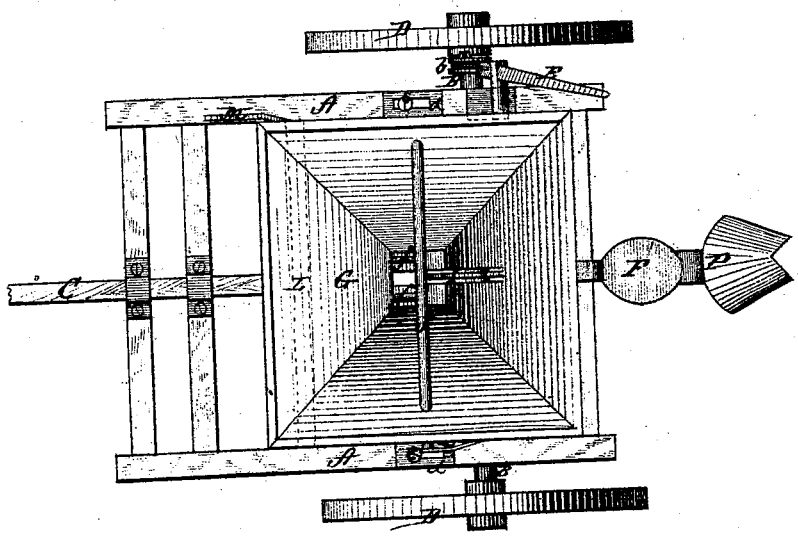

Figure 2, a plan view of my machine.

A represents the frame of the machine, having suitable journal-boxes, a a, on its under side, through which the axle B passes.

The journal-boxes a a are not placed under the centre of the frame A, but nearer the rear end, the front end of the frame being supported by the team attached to the tongue C, which is suitably secured to the front end of the frame.

On the ends of the axle B are mounted the wheels D D, which turn loosely on the axle, but one of which may be thrown in gear, so as to turn the axle, by the following means:

Inside of one of the wheels D, the axle B is provided with a movable collar, b, which has a lug or pin on its outer side.

By means of a lever, E, so arranged on the frame A, that the driver, seated on his seat, F, on the rear portion of the frame, can easily reach and operate the same, the collar b is moved close to the wheel D, so that its lug or pin fits into a hole or recess in the hub, thereby causing the collar to revolve with the wheel, and, as said collar is attached to the axle B, it will cause the axle also to revolve.

The seed-hopper G is secured to the frame A, in front of the axle B, by means of plates, d d, secured one to each side of the hopper, and bent outward, so as to rest flat on the side-beams of the frame, where they are secured by set-screws, e e.

These set-screws pass through slots in the plates d d, as seen in fig. 2, so that the hopper G can be moved closer to or further from the axle B, for a purpose that will be hereinafter fully set forth.

The hopper G has a slot in its bottom, which slot extends up a suitable height on the rear side of the hopper, and under the bottom of the hopper is a flat tube, H, open at the rear edge, through which tube seed is passed down into the ground, by means of a toothed wheel, I, which is secured on the axle B, and enters into the hopper G through the slot mentioned.

It will readily be seen, that by moving the hopper closer to or further from the axle, as above mentioned, the toothed wheel I is made to penetrate more or less into the hopper, and, consequently, discharges more or less seed, as may be desired.

Through the centre and across the hopper G, is a shaft, J, provided within the hopper, with teeth, f f, and one end of said shaft is on the outside of the hopper, provided with a lever, K, which rests on the axle B.

At the point where the lever K rests on the axle, a pin, h, is passed through the axle, so that at each revolution the lever will be twice lifted or raised up.

As soon as the pin h passes off from the end of the lever K, a spring, i, attached to said lever, as seen in fig. 1, brings the lever back again on to the axle B, thus causing the teeth or arms f f to agitate the seed in the hopper.

In the sides of the frame A, in front of the hopper G, is a shaft, L, provided at one end with a lever, M, by means of which the shaft is turned at will.

To the centre of the shaft L, directly in front of the tube H, is secured the furrow-plow, N, connected by means of the chain k, to the front end of the frame A.

The plow N is readily raised up out of the ground, by means of the lever M.

Directly under the seat F, in the centre of the rear cross-bar of the frame A, and extending downward, is a standard, O, at the lower end of which is pivoted the covering-plow P.

Having thus fully described my invention,

What I claim as new, and desire to secure by Letters Patent, is—

1. The slotted hopper G, constructed as described, and provided with tube H, and slotted side-plates d d, substantially as and for the purposes herein set forth.

2. In combination with the hopper G and tube H, the toothed wheel I, mounted upon the axle B, substantially as and for the purposes herein set forth.

3. The arrangement of the shaft J, teeth or arms f f, lever K, pin h, and spring i, all constructed and operating substantially as and for the purposes herein set forth.

4. The combination and arrangement of the frame A, axle B, wheels D D, collar b, lever E, seat F, hopper G, tube H, wheel I, agitator J f, and the device for operating the same, shaft L, lever M, furrow-plow N, and covering-plow P, all substantially as herein set forth.

In testimony that I claim the foregoing, I have hereunto set my hand, this 28th day of September, 1869.

A. R. NIXON.

Witnesses:
ANDREW GRIMES,
C. UNVERGAZT.